(12) United States Patent
Sadowski et al.

(10) Patent No.: US 7,563,058 B2
(45) Date of Patent: Jul. 21, 2009

(54) WEB FREE EROSION CONTROL BLANKET

(75) Inventors: Terry Sadowski, Rice Lake, WI (US); Douglas Steinbuch, Rice Lake, WI (US); Tony Johnson, Rice Lake, WI (US)

(73) Assignee: American Excelsior Company, Arlington, TX (US)

(*) Notice: Subject to any disclaimer, the term of this patent is extended or adjusted under 35 U.S.C. 154(b) by 0 days.

(21) Appl. No.: 12/004,558

(22) Filed: Dec. 20, 2007

(65) Prior Publication Data

US 2008/0159816 A1    Jul. 3, 2008

Related U.S. Application Data

(62) Division of application No. 11/022,191, filed on Dec. 22, 2004, now abandoned.

(60) Provisional application No. 60/532,843, filed on Dec. 23, 2003.

(51) Int. Cl.
*E02D 17/20* (2006.01)

(52) U.S. Cl. .................. 405/302.6; 405/302.4; 47/56

(58) Field of Classification Search ................ 47/56
See application file for complete search history.

(56) References Cited

U.S. PATENT DOCUMENTS

| | | | |
|---|---|---|---|
| 2,713,749 | A | 7/1955 | Hult |
| 2,826,865 | A | 3/1958 | Chohamin |
| 3,182,696 | A | 5/1965 | Hubbard |
| 5,226,255 | A | 7/1993 | Robertson |
| 5,249,893 | A | 10/1993 | Romanek et al. |
| 5,735,982 | A | 4/1998 | Prunty et al. |
| 5,786,281 | A | 7/1998 | Prunty et al. |
| 5,942,029 | A | 8/1999 | Spittle |
| 6,135,672 | A | 10/2000 | Davidson |
| 6,905,289 | B1 | 6/2005 | Sanguinetti |

*Primary Examiner*—Tara Mayo-Pinnock
(74) *Attorney, Agent, or Firm*—Winstead PC

(57) ABSTRACT

A vegetation growth-enhancing erosion control blanket is formed from an elongated rectangular excelsior/wood wool mat. The mat is held together with threads stitched therein. When the finished blanket is placed atop the ground, the blanket serves to shield the earth area from wind and water erosion forces. As the ground vegetation grows, it ultimately replaces the blanket which decomposes and furnishes the ground vegetation with a nutritive mulch.

7 Claims, 6 Drawing Sheets

WEB FREE EROSION CONTROL BLANKET

CROSS-REFERENCE TO OTHER APPLICATION(S)

This application is a divisional application of U.S. patent application Ser. No. 11/022,191, filed on Dec. 22, 2004 now abandoned. U.S. patent application Ser. No. 11/022,191 claims priority to and incorporates by reference the entirety of U.S. Provisional Application No. 60/532,843, filed Dec. 23, 2003. U.S. patent application Ser. No. 11/022,191 and U.S. Provisional Application No. 60/532,843 are incorporated herein by reference.

BACKGROUND OF THE INVENTION

1. Field of the Invention

The present invention relates to erosion control blankets for inhibiting ground erosion in flat or sloping, often bare earth areas, or channels, where water flows, and, more particularly, but not by way of limitation, to fibrous erosion control blankets adapted to permit ground vegetation to grow upwardly therethrough and manufactured without conventional netting.

2. History of the Prior Art

For both aesthetic and environmental protection reasons, it is often necessary or desirable to grow ground vegetation, such as grass, on flat land or slopes, channels, and bare earth areas to inhibit erosion due to the effects of wind and rain. The successful sprouting and growth of ground vegetation planted on these areas, however, is often prevented by the soil erosion which the planted vegetation is designed to inhibit, the erosion frequently carrying away at least some portion of the soil before it the vegetation takes hold.

To alleviate this problem, it is now a common practice to cover the area with fibrous, mat-like members commonly referred to as erosion control blankets. One particularly effective erosion control blanket is the CURLEX® or excelsior blanket manufactured and sold by the American Excelsior Company of Arlington, Texas since 1964. This erosion control blanket is fabricated, in elongated rectangular mat form, from elongated, randomly intertwined fiber commonly referred to as "excelsior" or "wood wool." The fiber mats have historically been held together or contained by photodegradable or netting material, which form nets on one or both sides of the fiber. The blanket-net assemblies are then conveniently packaged in individually rolled bundles to facilitate their handling and transport to the erosion control job site. The netting is generally necessary during manufacturing, shipping and the subsequent job site installation in order to maintain the integrity of a fibrous mat.

At the job site, the blanket bundles are unrolled in a side-to-side relationship along the earth area to be protected against erosion, and are secured along the sides of one another and to the underlying ground area with the use of a spaced series of conventional ground staple members, which may be made of steel, wood, plastic or starch. The installed blankets generally have parallel sides and abut one another to form a substantially solid surface to shield the underlying earth area, and thus the planted ground vegetation therein, from wind and water erosion forces.

The individual fibers forming the mat portions of various types of the blankets collectively define therebetween a multiplicity of small interstitial regions through which the planted ground vegetation may upwardly sprout and grow. During such shielded vegetation growth, some varieties of the blankets, such as the CURLEX® blanket decompose, ultimately being replaced by the emerging ground vegetation.

Despite the erosion control effectiveness of these excelsior/wood wool blanket-net assemblies, and similar blankets formed from other fibrous-net materials, erosion control blankets of this general type have a distinct disadvantage. The problem pertains to the use of the netting material often utilized to contain the fiber. Although the netting may be photodegradable, it may last long enough to present ecological and maintenance problems. It has been reported that conventional netting is capable of trapping birds and other small wildlife attempting to nest or inhabit the erosion control blankets. Until the netting material photodegrades, it does present an ecological impediment to normal animal activity. In addition, the netting, which often forms a large grid of material that can become entangled in mowing equipment before the material photodegrades.

In U.S. Pat. No. 5,735,982, herein incorporated by reference in its entirety, a net free erosion control blanket is described. As described therein, the erosion control blanket is held together by a bonding agent such as latex. Although, the above-described blanket does not include a net and therefore provides the advantages of a net-free assembly, the use of latex is, in some instances, cost prohibitive. In those instances where the entire erosion control blanket must biologically degrade as does excelsior/wood wool, a different system of securement for the excelsior/wood wool fibers is necessary. The present invention provides such a system by incorporating a stitching technique, which in conjunction with the intertwined relationship of the excelsior/wood wool fibers, as described herein, provides an effective erosion control blanket that is environmentally friendly.

BRIEF SUMMARY OF THE INVENTION

The present invention relates to erosion control blankets. More particularly, one aspect of the invention relates to a vegetation growth-enhancing erosion control blanket having a first surface that may be placed upon, and in contact with, an area on which ground vegetation is to be grown, and a second surface opposite thereto. The blanket includes a flexible mat of intertwined, elongated members, the members collectively defining in the mat a multiplicity of interstitial regions through which portions of the growing ground vegetation may pass generally transversely to said mat. At least a major portion of the members are held in place with a thread stitched therethrough in a manner providing the mat with structural integrity. The second surface of the mat includes a combination of the thread and the members for subsequent physical degradation following the erosion control. In one embodiment, the thread is generally biodegradable.

In another aspect, the present invention relates to a method of manufacturing an erosion control blanket. The method includes the steps of forming a flexible mat of intertwined, elongated members, said members collectively defining a multiplicity of interstitial regions in said mat through which vegetation may pass, and securing at least a major portion of said members via stitching a thread through a top surface and a bottom surface of the mat. In one embodiment, the thread is generally biodegradable.

In another aspect, one embodiment of the invention includes a vegetation growth-enhancing erosion control blanket having a first surface that may be placed upon, and in contact with, an area on which ground vegetation is to be grown, and a second surface opposite thereto. The blanket comprises a flexible mat of intertwined, elongated members, the members collectively defining in the mat a multiplicity of interstitial regions through which portions of the growing ground vegetation may pass generally transversely to the mat. At least a major portion of the members are held in place with a thread stitched therethrough in a manner providing the mat with structural integrity. The second surface comprises the top of the mat affording a combination of the thread and the members for subsequent physical degradation following the erosion control. In one embodiment, the thread is generally biodegradable and may be comprised of rayon, cotton, jute, or the like. In another embodiment, the elongated members comprise CURLEX® excelsior/wood wool.

In yet a further aspect, one embodiment of the invention comprises a method of manufacturing an erosion control blanket. The method includes the steps of forming a flexible mat of intertwined, elongated members, the members collectively defining a multiplicity of interstitial regions in the mat through which vegetation may pass. At least a major portion of the members are secured through stitching a thread through a top surface and a bottom surface of the mat. In another embodiment, the thread is generally biodegradable and may be comprised of rayon, cotton, jute or the like. In yet another embodiment the above described method further includes the step of passing the stitched mat under thread tensioning rollers.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE INVENTION

Figure 1:
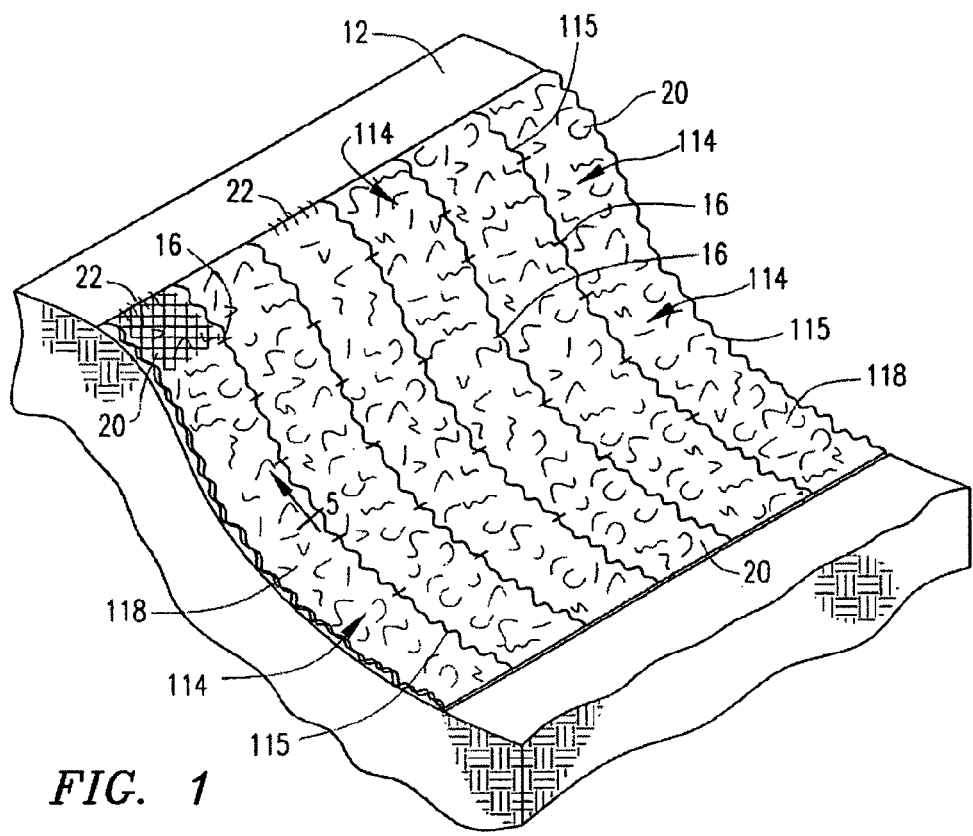
FIG. 1 is a fragmentary perspective view of a sloping ground area covered by a series of vegetation growth-enhancing erosion control blankets.

Referring first to FIG. 1 there is shown in simplified form a section of ground having a downwardly sloping earth portion 12 normally subject to undesirable wind and water erosion forces, and upon which erosion-inhibiting ground vegetation is to be grown. Covering the sloping earth portion 12 are a series of specially designed vegetation growth-enhancing, erosion control blankets 114. Blankets 114 have a porous construction through which the planned-for ground vegetation may readily germinate and grow.

Referring still to FIG. 1, the blankets 114 have elongated, generally rectangular configurations (zig-zag shaped sides 115, in this embodiment) and are conventionally secured to one another and to the underlying sloping earth portion 12, by a spaced series of ground staples 16. Installed in this manner, the blankets 114 shield the sloping earth portion 12 from both wind and rain until the ground vegetation takes hold.

Referring still to FIG. 1, each of the erosion control blankets 114 includes an elongated rectangular mat 118 formed from fibrous material—i.e., a multiplicity of elongated fibers 20 disposed in a randomly intertwined relationship. Wood fibers 20 of the excelsior/wood wool variety are preferably used and collectively define therebetween a multiplicity of relatively small interstitial regions through which ground vegetation, such as the grass 22 may upwardly grow from the sloping earth portion 12 protectively covered by blankets 114. Each mat 118, in this particular embodiment, has a substantially flat bottom surface 124, positionable directly against the sloping earth portion 12, a portion of which being diagrammatically illustrated, as will be described in more detail below.

Figure 2:
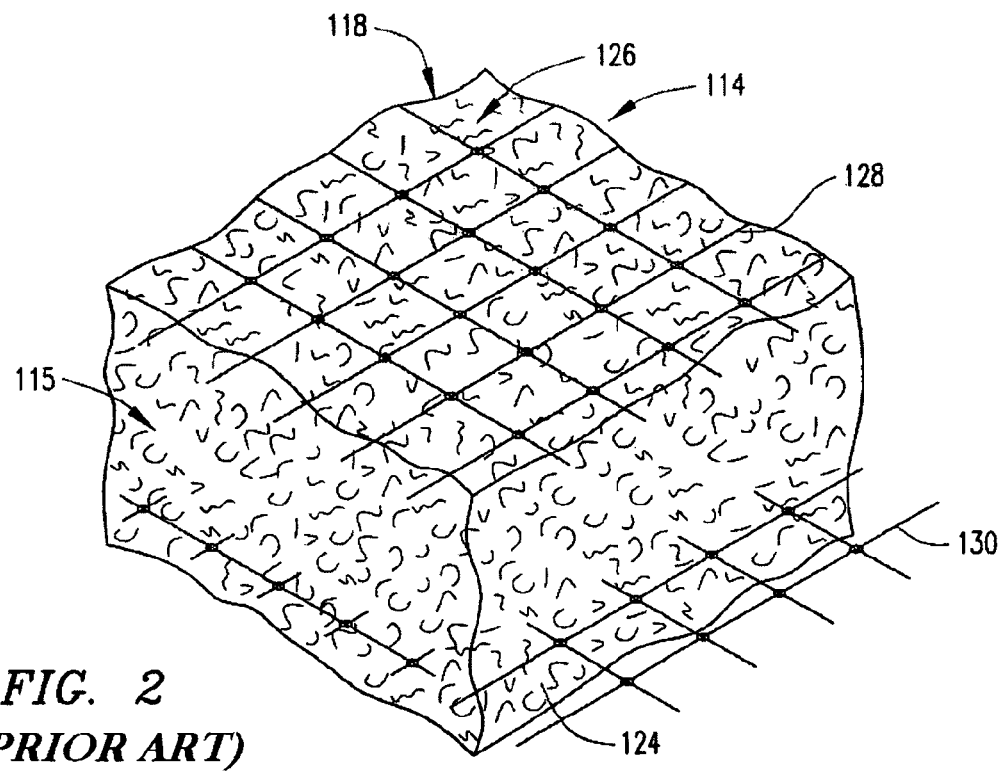
FIG. 2 is an enlarged, fragmentary perspective view of a portion of an erosion control blanket.

Referring now to FIG. 2, an enlarged, perspective view of a portion of a prior art erosion control blanket 114 is shown. Some prior art blankets 114 are formed with straight sides 115 and at least one layer of a photodegradable netting 128 extending across a top side 126 to form a mat 118. A second plastic net 130 may be attached to the bottom side of the blanket to extend generally parallel to the top net member 128. Netting 128 and 130 serve to flexibly reinforce conventional mats 118 and facilitate their handling during installation of the erosion control blankets 114.

From a structural standpoint, the prior art erosion control blankets 114 are effective for erosion control. One embodiment of the blanket 114 shown in FIG. 2 has been manufactured and sold by the American Excelsior Company, Arlington, Tex. under the trade name "CURLEX." However, in accordance with an important aspect of one embodiment of the present invention, the nettings 128 and 130, which may create ecological problems, have been removed and replaced with a thread binding as described below.

Figure 3:
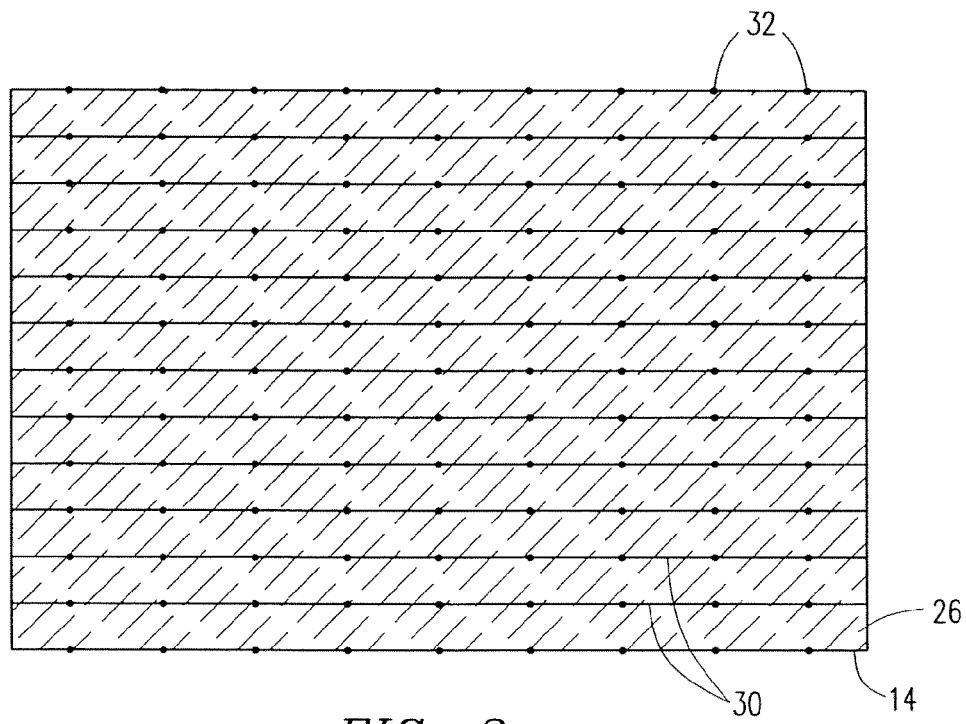
FIG. 3 is an enlarged top plan view of one embodiment of an erosion control blanket constructed in accordance with the principles of the present invention.

Referring now to FIG. 3 there is shown an enlarged top plan view of an erosion control blanket 14 illustrating one aspect of the fabrication thereof in accordance with one embodiment of the principles of the present invention. The top surface 26 of erosion control blanket 14 is bound in place by thread 30. In one embodiment, the thread 30 may be generally biodegradable and made of rayon, cotton, jute or the like. The thread 30 is held in place by stitches 32 that perforate through the top surface 26 of the blanket 14 to the bottom surface 34 of the blanket 14. In the preferred embodiment, the threads are similarly spaced horizontal threads 30 bound in place by stitches 32 at regular intervals along the blanket 14. However, other orientations of threads 30 and stitches 32 may be utilized in accordance with aspects of the present invention. For example, vertical or diagonal threads 30 may be implemented and held in place by randomly positioned stitches 32.

Referring still to FIG. 3, the fibers 20 of this particular embodiment are packaged in an intertwined manner and held together with thread 30 and stitches 32 as described above. The fibers 20, in the preferred embodiment, are wood material shaved to form CURLEX® excelsior fibers 20 with barbed edges. 80% of the fibers 20 are six inches or longer with a consistent width and thickness. The barbed edges and curled orientation of the fibers 20 interlock and assist in holding the blanket 14 together. It should be noted, however, that the fibers 20 of the present invention may include any elongated members of wood wool which may be intertwined into a flexible mat. CURLEX® excelsior fibers comprise the preferred embodiment but other wood wool is contemplated by the present invention.

Figure 4:
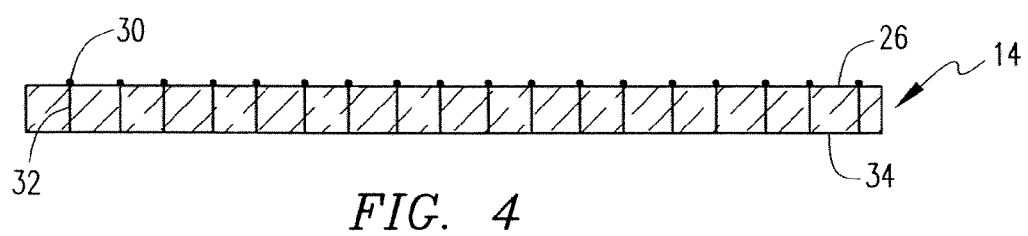
FIG. 4 is a side elevational view of the erosion control blanket of FIG. 3.

Referring now to FIG. 4 there is shown a side elevational view of the blanket 14 of FIG. 3. Consistent therewith, the stitches 32 are shown as vertical lines extending from the top surface 26 to the bottom surface 34 substantially near the threads 30. As previously mentioned, the stitching pattern and threads 30 may be in a variety of orientations other than the preferred embodiment shown. The bottom surface 34 is substantially flat and engages the surface of the sloping earth portion 12 as shown in FIG. 1 to permit the infiltration of soil thereagainst and the stabilization of the blanket 14 thereupon.

Figure 5:
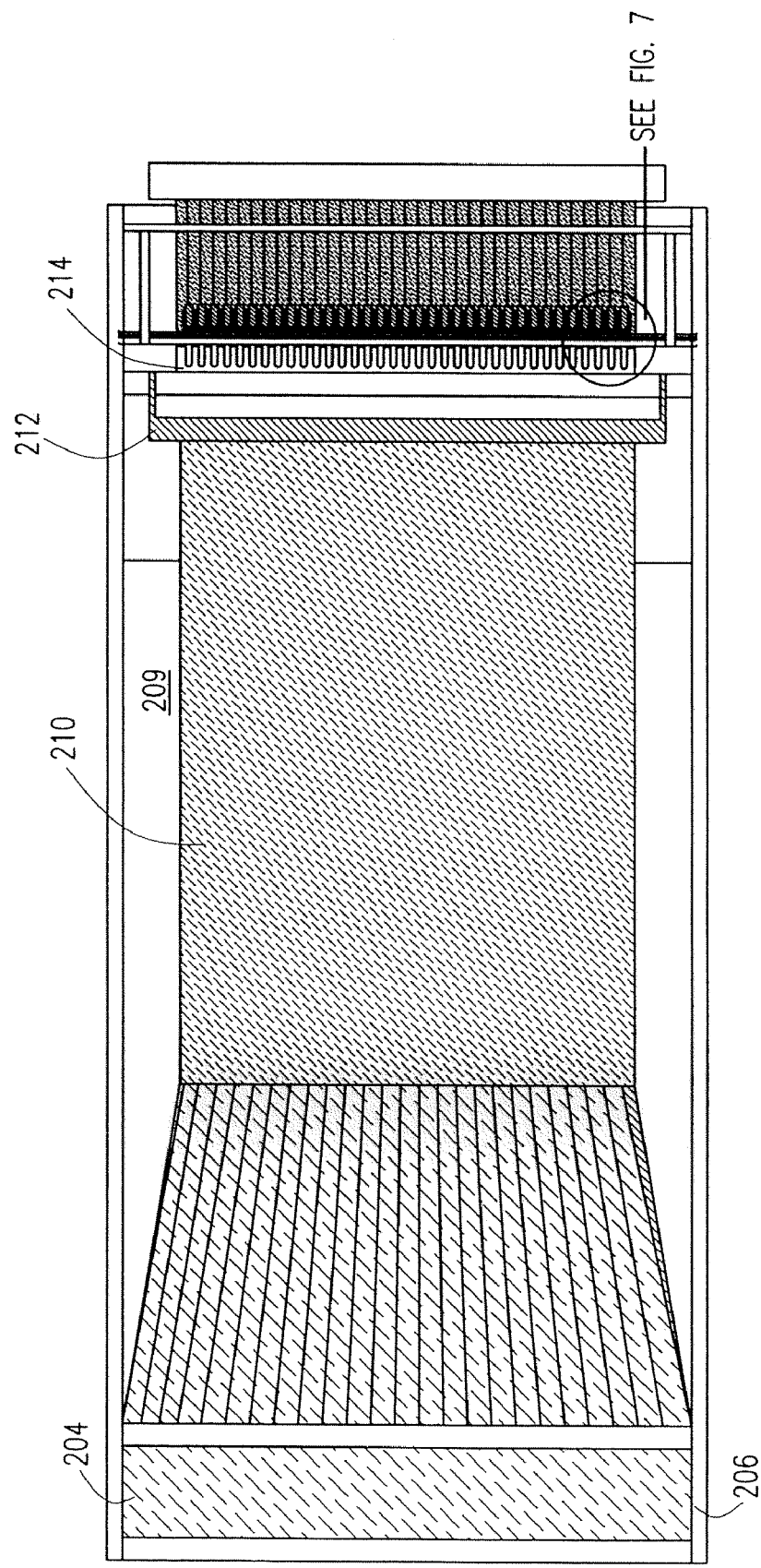
FIG. 5 is a diagrammatic top view of an erosion control blanket manufacturing process in accordance with one embodiment of the principles of the present invention.
Figure 6:
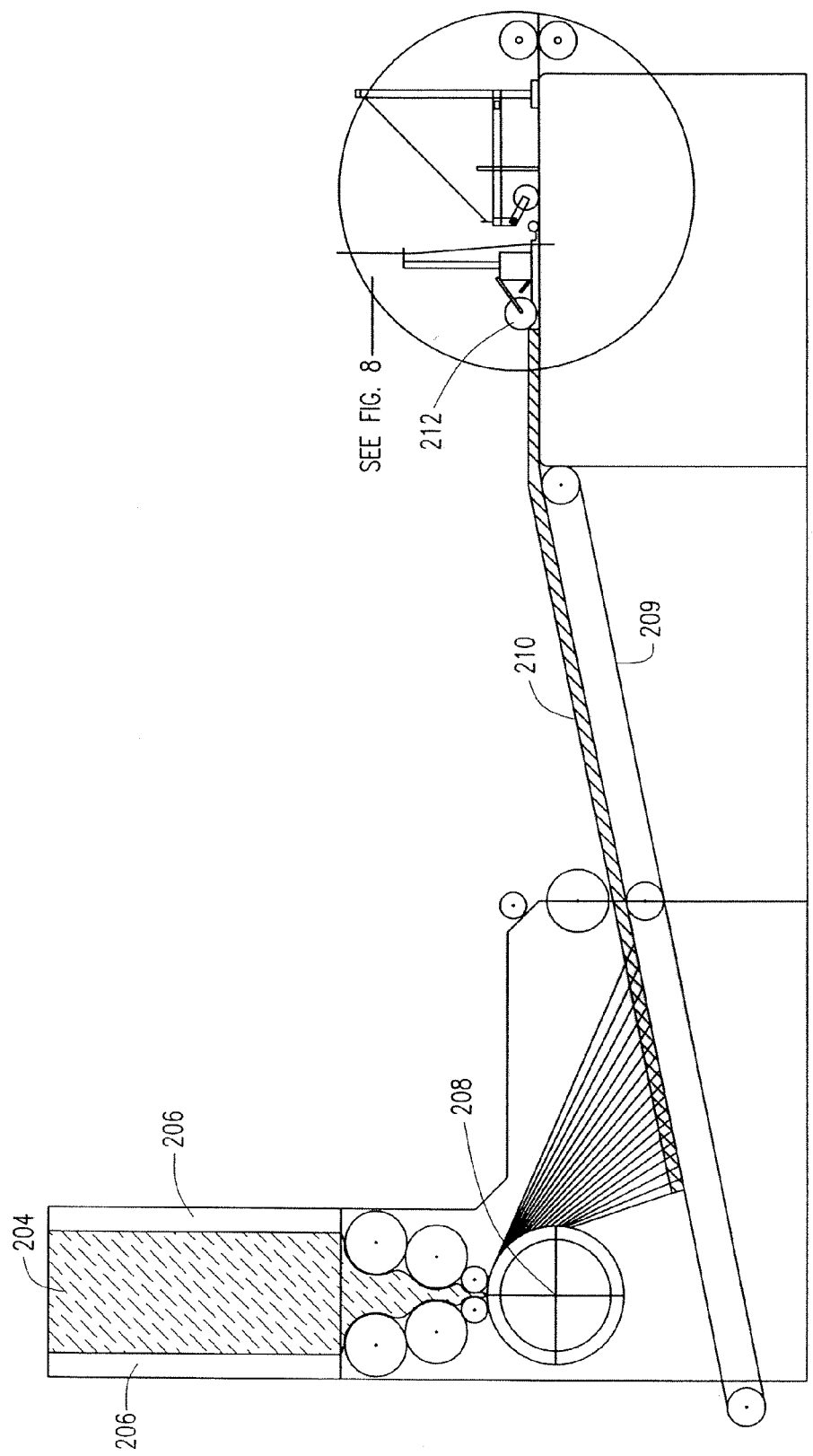
FIG. 6 is a diagrammatic side view of the erosion control blanket manufacturing process of FIG. 5.

Referring now to FIGS. 5 and 6 there is shown a method of manufacturing the control blanket 14 of the present invention. The manufacturing process occurs by accumulating fibrous material 204, preferably of the excelsior/wood wool variety, placing it within a hopper 206 where it is compacted and discharged from the hopper end 208. The discharged mat 210 is received upon a conveyor belt 209 which transports the mat 210 to a stitching area. A roller 212 is positioned adjacent a stitcher head 214 to further compress the mat 210 prior to stitching. The stitching head 214 is described with greater detail below with reference to FIG. 6. The threads 30 are stitched into place and the stitched blanket 14 is later packaged for distribution.

Figure 7:
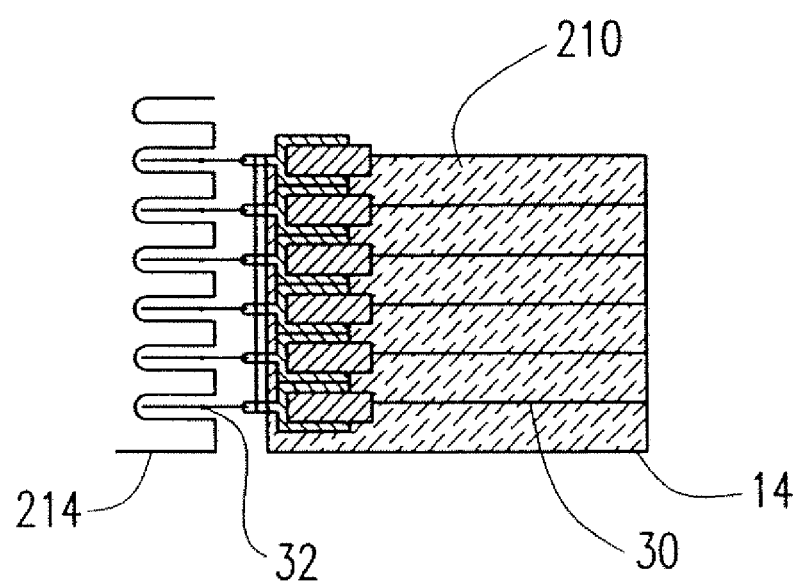
FIG. 7 is an enlarged view of a stitching portion of the erosion control blanket manufacturing process of FIG. 5.
Figure 8:
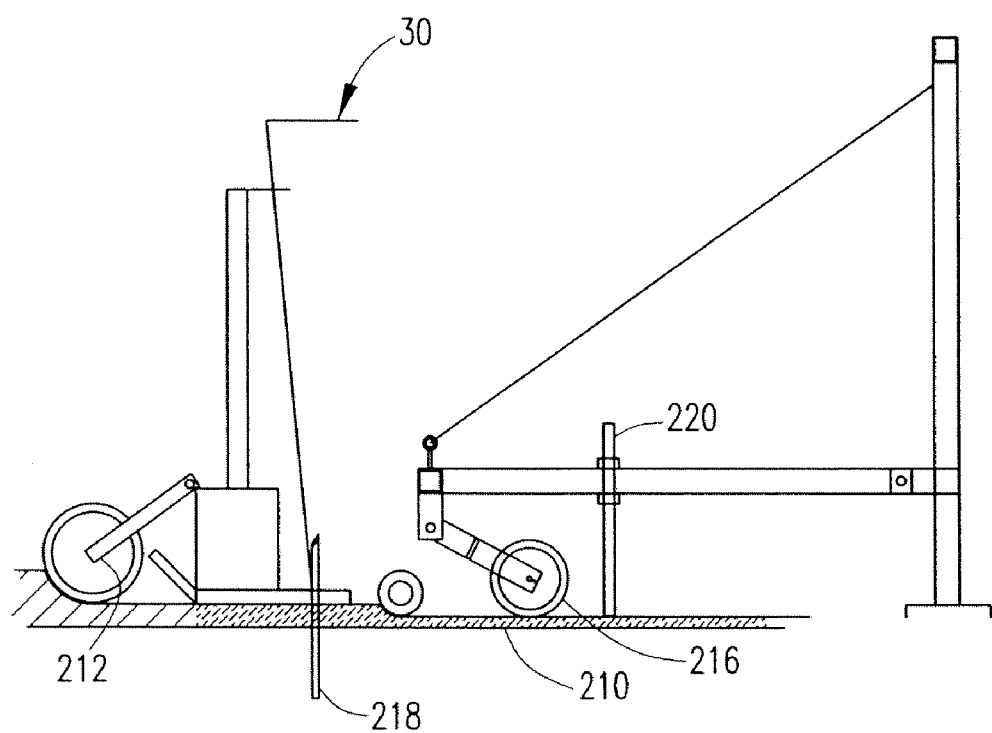
FIG. 8 is an enlarged view of the stitching portion of the erosion control blanket manufacturing process of FIG. 6.

Referring now to FIGS. 7 and 8, the stitcher head and stitching of the mat 210 are shown in greater detail. Stitches 32 are placed through the top surface of the mat 210 at the stitcher head 214 and the blanket 14 formed is then passed under thread tensioning rollers 216 to maintain the proper tension of the thread 30. The thread 30 runs from an upper area of the machine toward a stitching needle 218. The stitching needle 218 pulls the thread 30 through the top surface of the mat 210 to the bottom surface of the mat 210. The stitching needle 218 then returns past the top surface of the mat 210 to prepare for another stitch. The stitching needle 218 engages the mat at appropriate intervals as discussed above. After the mat is stitched, the blanket 14 is compressed and the thread tensioning rollers 216 maintain proper tension of the thread 30. A pressure adjusting bolt 220 may be utilized to adjust the tension of the rollers 216. The formed blanket 14 may then be rolled or cut at specific intervals and packaged for distribution.

The above-referenced stitching system is useful in the manufacture of an erosion control blanket due to the multiplicity of elongated, intertwined members that collectively define a multiplicity of interstitial regions with which the stitching is permitted to secure the intertwined members together. It has been noted that the propensity of excelsior/wood wool to maintain the intertwined relationship lends itself to the stitching technique defined herein, and provides an erosion control blanket for multiple environmentally-safe applications where other fibrous type materials may not lend themselves to such a stitching operation. As referenced above, a generally biodegradable thread is a preferred embodiment. However, one embodiment includes a thread made of polypropylene or the like. The length of thread in the biodegradable excelsior mat of the present invention presents a more environmentally friendly configuration than prior art "net" mats.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A vegetation growth-enhancing erosion control blanket having a first surface and a second surface opposite thereto, said blanket consisting of:

a single layer, net-free flexible mat constructed of a multiplicity of elongated excelsior fibers disposed in a randomly intertwined relationship, the outer exposed areas of said multiplicity of fibers defining said first and second surfaces of said blanket;

said multiplicity of elongated excelsior fibers collectively defining in said net-free mat a multiplicity of interstitial regions and defining said blanket through which portions of growing vegetation may pass generally transversely, at least a major portion of said elongated excelsior fibers being held in place with a thread stitched therefrom in a manner providing said net-free mat with structural integrity;

said first and second surface of said net-free flexible mat being net-free and consisting solely of said multiplicity of elongated excelsior fibers and said thread; and and said first and second surfaces forming the top and bottom, respectively, of said net-free mat.

2. The erosion control blanket of claim 1, wherein the thread is generally biodegradable.

3. The erosion control blanket of claim 2, wherein the thread is generally biodegradable and is selected from the group consisting of rayon, cotton and jute.

4. The erosion control blanket of claim 1, wherein the thread is comprised of polypropylene.

5. The erosion control blanket of claim 1, wherein the stitches are formed in a uniformly spaced linear pattern.

6. The erosion control blanket of claim 1, wherein the excelsior material is formed to include barbed edges.

7. The erosion control blanket of claim 1, wherein 80% of the excelsior material is six inches or longer with a consistent width and thickness.

* * * * *